United States Patent [19]

Reinke

[11] Patent Number: 4,564,978
[45] Date of Patent: Jan. 21, 1986

[54] CRAB BODY SUPPORTING MEANS FOR A VIBRATORY TYPE MACHINE FOR REMOVING EDIBLE MEAT

[75] Inventor: Theodore S. Reinke, Kennett Square, Pa.

[73] Assignee: Sea Savory, Inc., Wingate, Md.

[21] Appl. No.: 604,971

[22] Filed: Apr. 27, 1984

[51] Int. Cl.⁴ ............................................. A22C 29/00
[52] U.S. Cl. ............................................. 17/71; 17/46
[58] Field of Search .............. 17/71, 48, 46; 209/674, 209/263, 266, 267; 99/444

[56] References Cited

U.S. PATENT DOCUMENTS 3,096,707  7/1963  Mills ...................................... 99/444
4,124,920  11/1978  Wenstrom et al. ..................... 17/48

Primary Examiner—Donald R. Schran
Assistant Examiner—James Wolfe
Attorney, Agent, or Firm—Scrivener, Clarke, Scrivener & Johnson

[57] ABSTRACT

In a machine for removing meat from a crab body by vibrating a core box having openings over each of which a crab body is supported, the invention provides a supplemental support substantially bisecting each opening to permit half bodies to be supported.

3 Claims, 4 Drawing Figures

4,564,978

CRAB BODY SUPPORTING MEANS FOR A VIBRATORY TYPE MACHINE FOR REMOVING EDIBLE MEAT

SUMMARY OF THE INVENTION

Apparatus for removing edible crab meat from the core portion of a crab body that has been de-shelled, de-legged and de-fingered and the central core portion of which has been cleaned. The crab body is supported in a core box with the body cavity directed downwardly over a discharge opening and the core box is vibrated to shake the crab meat from the core, and the core box is provided with supplemental supports so that two half-crab bodies can be supported over each discharge opening.

BACKGROUND OF THE INVENTION

In the U.S. Pat. Nos. 4,124,920 to Wenstrom et als. and 4,321,730 to Tolley et al. there are disclosed and claimed a method and apparatus for removing edible meat from Chesapeake Bay blue crabs which have been processed by being de-shelled, de-legged, de-fingered and the central body cavity cleaned, by positioning each processed whole crab body in inverted position over a discharge opening in a core box and then vibrating the core box at high speed to shake the meat from the crab body.

In my application for U.S. Pat. No. 541,092, filed Oct. 12, 1983, for Method and Apparatus for Removing Lump Crab Meat From a Chesapeake Bay Blue Crab, the processed crab body is cut along planes which converge along the back of the crab body, cutting the shoulder bones and opening the lump meat cavity at its central cavity side, thus permitting removal of the lump meat from the "inside" rather than through an opening made by cutting the backfin at its knuckle.

This method of backfin lump removal, while successful for its designed purpose, has the disadvantage of cutting the crab body in half, thus making each half too small to be supported in the discharge opening pocket of a core box designed to accomodate only complete processed crab bodies. It has therefore been the object of this invention to modify the known core box to permit each pocket to accomodate and hold two of the half-bodies produced in the practice of my invention, thus permitting more universal use of the known apparatus for practicing the vibratory method of removing the remainder crab meat not removed as lump meat from the half shells.

DESCRIPTION OF THE PREFERRED EMBODIMENT OF THE INVENTION

Figure 1:
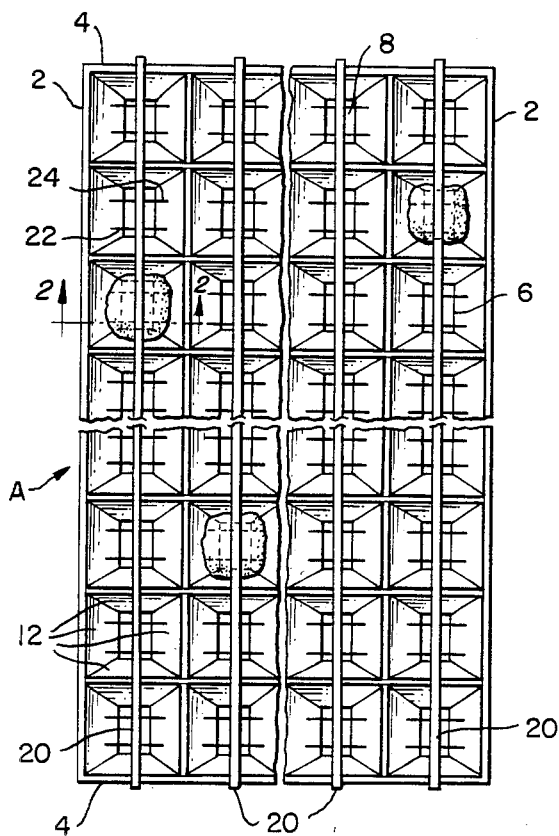
FIG. 1 is a plan view, with parts broken away, of a core box with the half-crab body support means provided by the invention.
Figure 2:
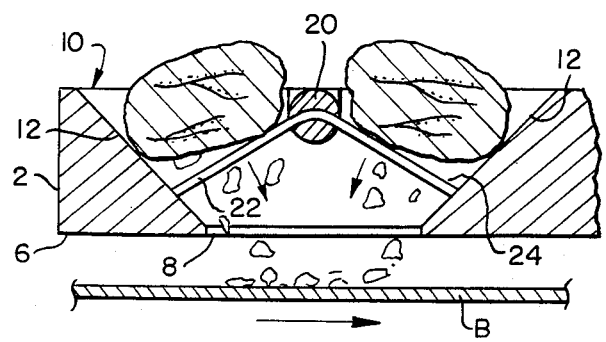
FIG. 2 is a sectional view taken on line 2—2 of FIG. 1.
Figure 3:
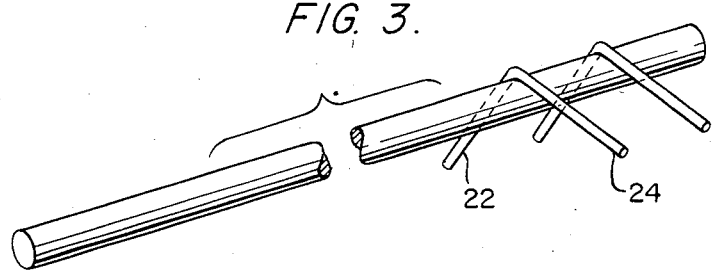
FIG. 3 is a perspective view of the rod support provided by the invention.

Referring first to FIGS. 1 and 2 a core-box assembly is illustrated which includes an open-topped tray-shaped core box A having side and end walls 2, 4 respectively, and a bottom wall 6 which contains a plurality of discharge openings 8. The core box is configured to define frustoconical or frusto- pyramidal pockets 10 which are defined by walls 12 which converge toward the discharge opening. The size of each pocket is slightly less than that of the core portion of a cooked crab body which has been de-shelled, de-legged and de-fingered and the central cavity of which has been cleaned. Full size crab cores may be placed in the pockets 10 with their cleaned cavities directed toward the discharge openings 8. As fully described in the Letters Patent referred to above, the core box assembly is adapted for sliding insertion into a core box holder, and the core box and its holder are vibrated simultaneously, causing edible crab meat particles to be removed from the crab cores and deposited by gravity upon a conveyor means which travels beneath the core box holder and which is shown at B in FIG. 2.

In the preferred embodiment of my invention, which is disclosed in FIGS. 1 and 2, means are provided for causing the above described apparatus to accomodate half-size crab bodies, and such means comprise a plurality of elongated rods 20 each of which is placed loosely on the upper surface of the core box extending along a line of pockets 10 and positioned centrally of all of the pockets in the line. Each rod has a plurality of pairs of pins 22, 24 extending angularly downwardly from the rod, the pins of each pair extending in opposite directions from the rod at an included angle of approximately 140°. The pairs of pins are themselves arranged in adjacent pairs along the length of the rod, whereby four pins form a closely spaced cluster of pins spaced longitudinally from adjacent clusters by a distance greater than the spacing of pins within a cluster. The positioning of the clusters of pins along the length of the rod is such that when the rod is positioned on the upper surface of the core box a cluster will be positioned in each pocket, so that a half crab body may be supported on each side of the rod, resting on the rod itself and on either the two pins 22 or the two pins 24.

Figure 4:
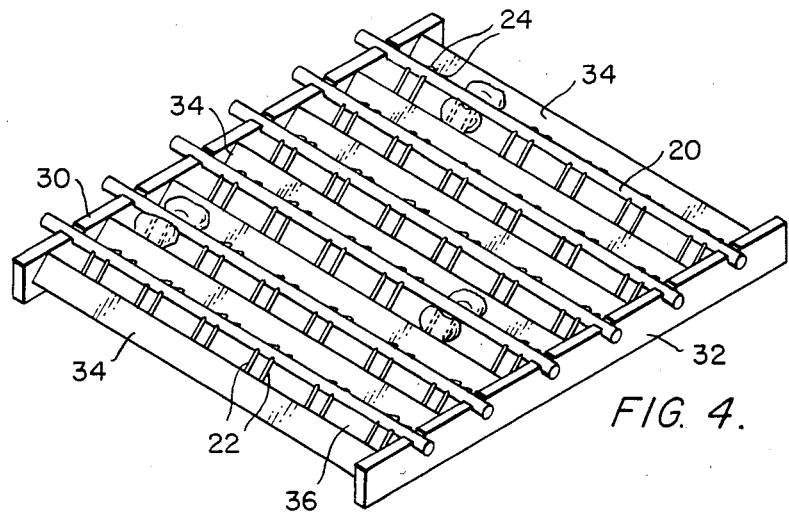
FIG. 4 is a perspective view showing the support applied to a second form of core box.

The invention is useful with core boxes of other types than that disclosed in FIGS. 1 and 2, and in FIG. 4 is disclosed in association with a core box having spaced parallel side walls 30, 32 between which there extend spaced parallel elongated support members 34 which define elongated discharge openings 36 between them through which edible crab meat passes from whole crab bodies supported on the members 34. In accordance with the invention a rod 20 with pins 22, 24 is positioned with its ends supported by the upper surfaces of the side walls 32, 34 and extending along along, above and centrally of each discharge opening 36 with the outer ends of the pins of each rod engaging the side walls of adjacent alongated support members 34, thus permitting each half crab body to be supported above the discharge opening by resting on the rod 20 and pins 22, 24.

It will be seen that the present invention permits the practice of my method and apparatus for removing the lump meat and also permits use of known and existing machines and core boxes for removing the remainder of the meat from the crab body, and that by reason of the invention expensive modification or replacement of such machines and core boxes are un-necessary.

I claim:

1. A core box for supporting prepared crab bodies in a machine for removing the crab meat by vibration, the core box having an upper surface and a bottom surface containing a plurality of discharge openings each of which is defined by the lower edges of downwardly converging walls the facing surfaces of which above each opening being spaced sufficiently to support a full size prepared crab body after being cooked, the carapace, claws and flippers removed, and the visceral cavity cleaned, and means for modifying the core box to permit partial crab bodies to be supported on the converging walls above each opening, comprising a rod supported on the upper surface of the core box and extending across the center of at least one opening in the bottom surface of the core box, and having at least one pair of pins extending from each side of the rod with the ends of the pins resting on the converging surfaces of the walls above the opening whereby the pins and converging wall surfaces form a support for a partial crab body.

2. A core box according to claim 1, in which each discharge opening is rectangular in shape and the openings are arranged in a plurality of lines of openings, and each rod extends over one of the lines of openings.

3. A core box according to claim 1, in which each discharge opening is elongated, and each rod extends longitudinally over one of the elongated openings.

* * * * *